(12) United States Patent
Diaz et al.

(10) Patent No.: US 7,889,149 B2
(45) Date of Patent: Feb. 15, 2011

(54) APERTURE MATCHED POLYROD ANTENNA

(75) Inventors: Rodolfo Diaz, Phoenix, AZ (US);
Jeffrey Peebles, Phoenix, AZ (US); Yan Guo, Tempe, AZ (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 318 days.

(21) Appl. No.: 12/004,681

(22) Filed: Dec. 21, 2007

(65) Prior Publication Data

US 2008/0252541 A1   Oct. 16, 2008

Related U.S. Application Data

(60) Provisional application No. 60/871,548, filed on Dec. 22, 2006.

(51) Int. Cl.
*H01Q 13/00* (2006.01)
(52) U.S. Cl. ............... 343/785; 343/771; 333/21 A; 333/21 R
(58) Field of Classification Search ........... 343/795, 343/787, 846, 700 MS, 785, 786, 771; 333/21 A, 333/21 R
See application file for complete search history.

(56) References Cited

U.S. PATENT DOCUMENTS

| | | | | |
|---|---|---|---|---|
| 3,320,614 A | * | 5/1967 | Jedrey, Jr. ............ | 342/188 |
| 4,673,947 A | * | 6/1987 | Newham ............... | 343/781 CA |
| 4,785,266 A | | 11/1988 | Newham et al. | |
| 6,208,308 B1 | | 3/2001 | Lemons | |
| 6,266,025 B1 | * | 7/2001 | Popa et al. ............ | 343/785 |
| 6,720,933 B2 | * | 4/2004 | Hanlin et al. ........... | 343/786 |

OTHER PUBLICATIONS

Marcuvitz, N., Waveguide Handbook, London: Peter Peregrinus Ltd, —Sections 4-6a, 4-6b, 4-7b, 4-12, 5-12, and 5-11, pp. 179-186, 196-201, 221-228, 257-265 (1993).
Stroobandt, S.Y., "An X-Band High-Gain Dielectric Rod Antenna" Report, Leuven Catholic University (Belgium), Aug. 1997, , http://hamwaves.com/antennas/diel-rod/dielectric_rod_antenna.pdf [accessed Jun. 4, 2009], 38 pages.

* cited by examiner

*Primary Examiner*—Tho G Phan
(74) *Attorney, Agent, or Firm*—Fish & Richardson P.C.

(57) ABSTRACT

A dielectric polyrod having at least one tapered section, where a section exposed outside of the waveguide is tapered along a curve that depends on the dielectric constant of the material used. The invention also relates to an aperture matched polyrod antenna which includes the same and an inductive tuning element used to achieve wideband impedance match and to create a Gaussian beam in the radiating near field of the antenna, suitable to mimic a small region plane wave.

14 Claims, 10 Drawing Sheets
(6 of 10 Drawing Sheet(s) Filed in Color)

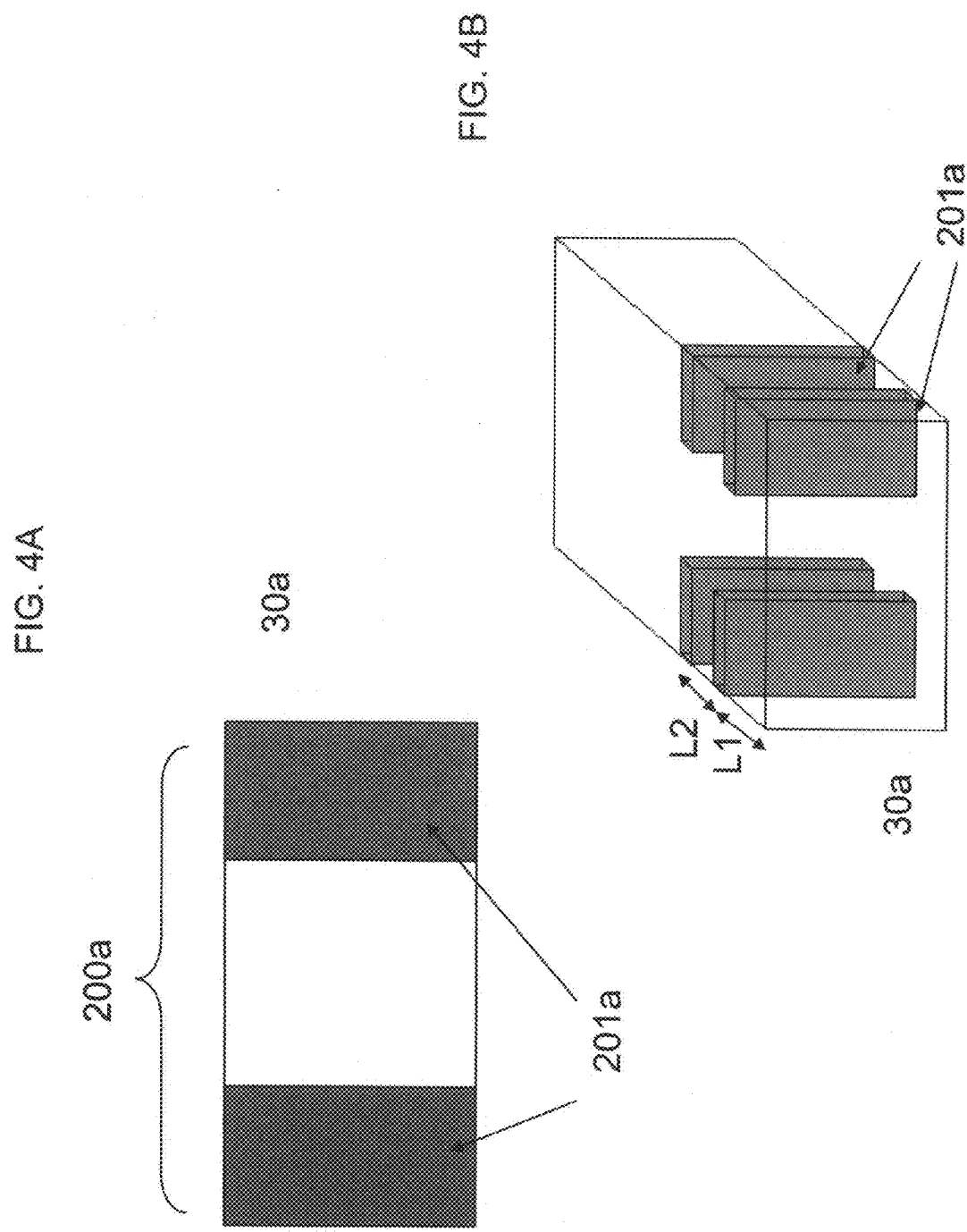

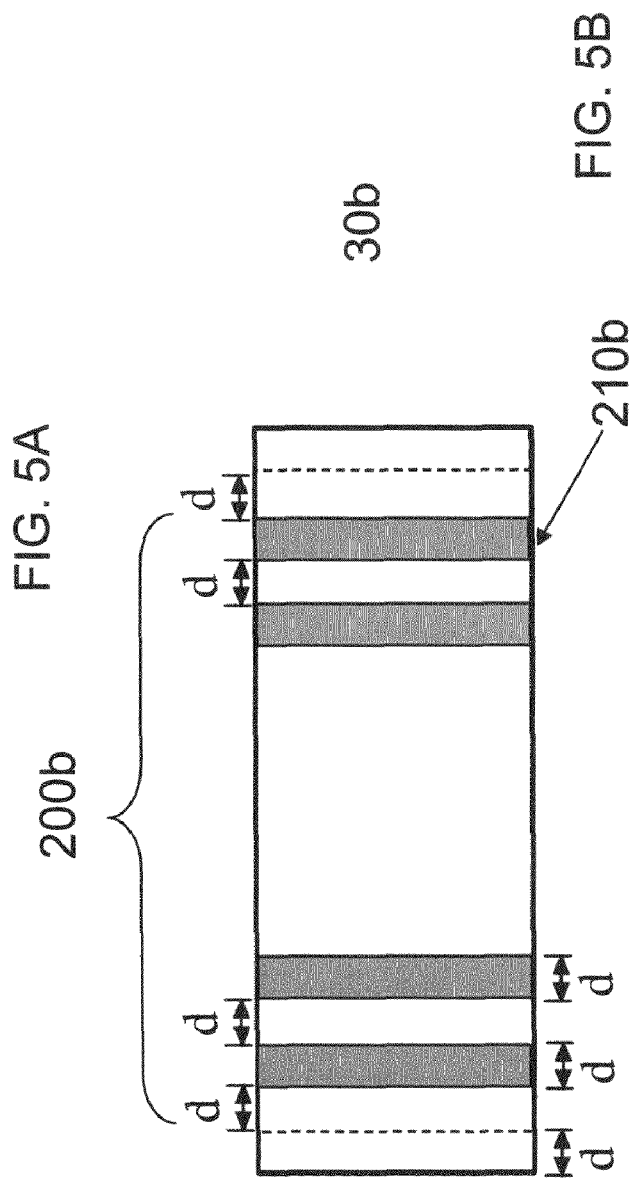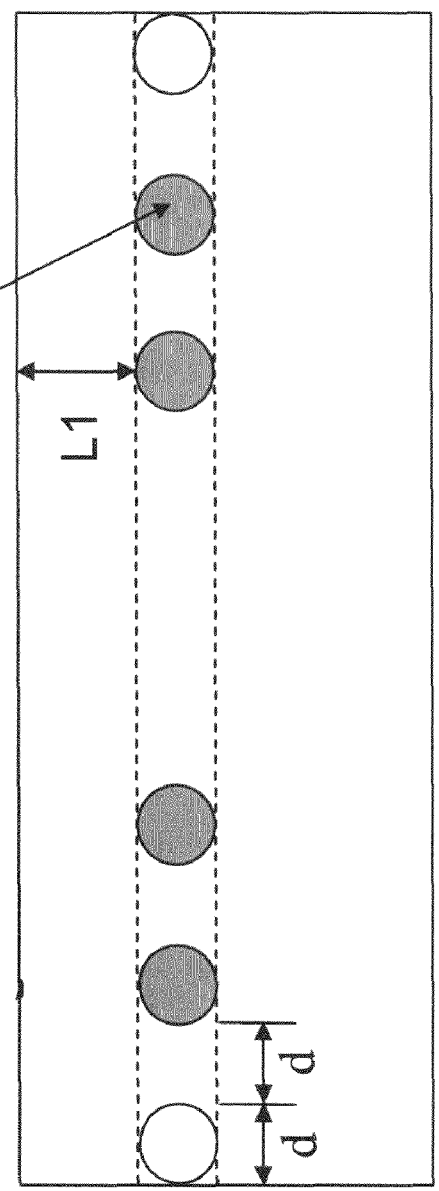

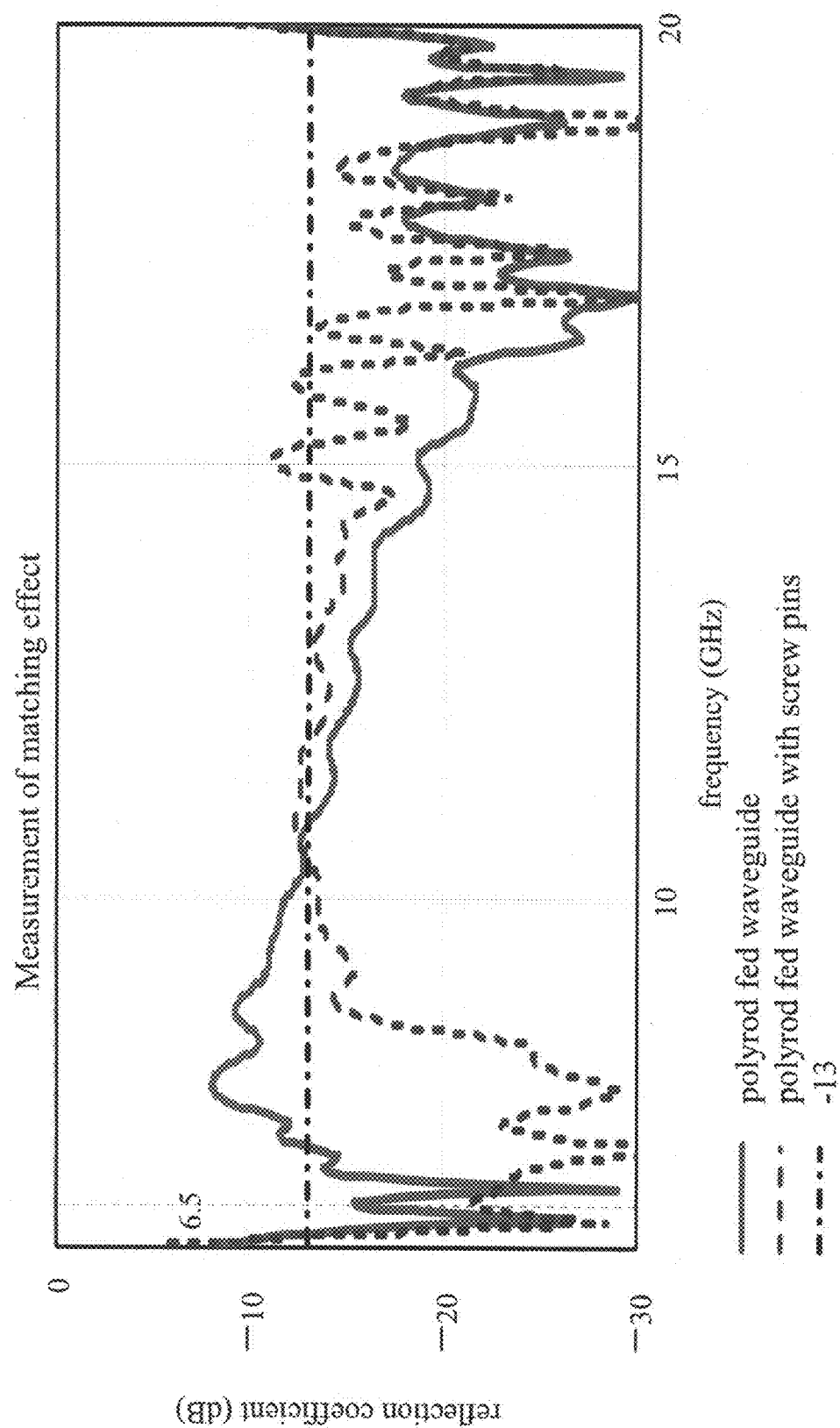

APERTURE MATCHED POLYROD ANTENNA

CROSS-REFERENCE TO RELATED APPLICATION

This application claims priority to and the benefit of U.S. Provisional Application No. 60/871,548, filed Dec. 22, 2006, the entire contents of which are expressly incorporated herein by reference.

FIELD

Antennas with matched apertures are generally discussed herein, with particular discussions extended to an antenna with a polyrod and/or an incorporating an inductive obstacle element.

BACKGROUND

The measurements of surface impedance for small regions are typically done by two approaches. The first approach is to create a small aperture on a screen to pass through the electromagnetic signal and the second approach is to use a system of lenses to focus the signal.

The first approach involves creating a small aperture on a metal screen through which the microwave field is coupled from a source on one side to a receiver on the other side. As such, when a material is placed over this aperture, the change in the transmitted field is related to the properties of the material. The problem with this approach is that the field at the aperture is not a plane wave and thus the response of the material to a plane wave is not being measured.

The second approach involves using a system of lenses to focus the signal traveling between a plane wave source and a plane wave. Such a focusing system can in principle concentrate the electromagnetic energy into a region approximately $\lambda/3$ in diameter, where $\lambda$ is a wavelength of the electromagnetic wave. The problem with this approach is that by definition the size of the spot generated is a strong function of frequency so that if a region 3" by 3" is being examined at 2 GHz, the region shrinks to 0.3" by 0.3" at 20 GHz, thus any manufacturing inhomogeneities in the material become significant sources of noise at high frequency.

Another problem associated with the lens approach is the speed of light in the focal spot of a focused beam system is not equal to the speed of light in free space but is actually faster. Furthermore, it is also well known that the near radiating field in the neighborhood of the focal spot is full of "hotspots" where the amplitude and phase of the electromagnetic beam varies rapidly.

Since the simplest, most reliable, and most broadband method for extracting constitutive properties from an electromagnetic material measurement occurs under plane wave conditions, the ability to mimic a plane wave condition at the material sample is of paramount importance.

SUMMARY OF THE INVENTION

An aspect of an embodiment of the present invention is directed toward a dielectric polyrod that minimizes or reduces end reflection and phase variation across a beam of electromagnetic radiation, or specifically a Gaussian Beam, as well as minimizing or reducing the diameter of the Gaussian beam. In one embodiment, the dielectric polyrod includes a short tapered section, a long tapered section, and an intermediate section, where the short tapered section is extended between the intermediate section and a first end, and the long tapered section is extended between the intermediate section and a second end oppositely facing the first end, and the long tapered section is tapered along a curve.

An embodiment of the present invention is directed toward an inductive obstacle such as a set of irises and/or posts disposed near at a waveguide mouth to provide a wideband impedance match. In yet another embodiment of the present invention, there is provided an antenna with a rectangular waveguide using one or both of the dielectric polyrod and the inductive obstacle discussed above. As a result, an aspect of an embodiment of the present invention is directed toward an antenna system for providing a substantial plane wave at a sample location at an operation frequency ranging from 7 GHz to 20.0 GHz.

The dielectric polyrod of an embodiment described above may have a short tapered section that is substantially linearly tapered.

The dielectric polyrod may also have a long tapered section, tapering along a curve that is substantially linear when the dielectric polyrod has a dielectric constant of about 2. Alternatively, the long tapered section is tapered along the curve that is exponentially shaped when the dielectric polyrod has a dielectric constant of about 3 or more.

In one embodiment, the intermediate section of the polyrod has an intermediate thickness, where the intermediate thickness is substantially larger than a first end of the polyrod thickness.

The short tapered section may have two larger surfaces facing each other, where the first and second larger surfaces constitute upper and lower portions and they both converge from the intermediate area to the first end.

The long tapered section may have two long sides extending from the intermediate area to a second end and wherein both the first side surface and the second side surface converge from the intermediate area to the second end. In one embodiment, the thickness of the second end and intermediate thickness is substantially equal to each other.

In one embodiment, the dielectric polyrod is configured to operate at a frequency range of 7 GHz to 20 GHz by having a length of about 4 inches at the short tapered section, a length of about 7 inches at the long tapered section, and an intermediate thickness of about 0.4 inches.

An embodiment of the present invention is directed toward a polyrod antenna that includes a dielectric polyrod having a curve as described above having a first end, and a waveguide for receiving the first end of the dielectric polyrod, where the waveguide having a first waveguide surface facing a flange and a second waveguide surface oppositely facing away from the first waveguide surface, and the dielectric polyrod with the short tapered end is inserted at the second waveguide surface.

The polyrod antenna may include one or a plurality of inductive tuning elements disposed at an inductive tuning distance away from the second waveguide surface.

In one embodiment of the present invention, the inductive tuning element includes a plurality of matching pins, where each of the matching pins has a pin diameter, and the pins are spaced apart from each other by an interval distance equal to or larger than the pin diameter.

In one embodiment of the present invention, the pin diameter is about 0.83 mm, the inductive tuning distance is about 1.5 mm, where both the pin diameter and the inductive tuning distances are configured to operate at a frequency ranging from about 7 GHz to about 20 GHz.

In one embodiment of the present invention, the second inductive tuning distance is one half of an operating wavelength of the polyrod antenna.

Alternatively, the inductive tuning element may include a first and second inductive iris panels defining an iris, wherein the first inductive iris panel is disposed at a first side wall of the waveguide, and the second inductive iris panel is disposed at a second side wall of the waveguide.

In another embodiment of the present invention, the inductive tuning element includes a plurality of matching pins spaced apart by an interval distance, wherein each of the pins has a pin diameter, where a first pin of the pins is disposed at a 2-pin diameter distance away from a first side wall of the waveguide, a second pin of the pins is disposed 1-pin diameter away from the first pin, a third pin of the pins is disposed at a 2-pin diameter distance away from a second side wall of the waveguide, and a fourth pin of the pins disposed 1-pin diameter away from the third pin.

Another aspect of an embodiment of the present invention is directed toward a method of manufacturing a dielectric polyrod and a polyrod antenna in accordance with the above descriptions.

BRIEF DESCRIPTION OF THE DRAWINGS

The accompanying drawings, together with the specification, illustrate exemplary embodiments of the present invention, and, together with the description, serve to explain the principles of the present invention.

The patent or application file contains at least one drawing/picture executed in color. Copies of this patent or patent application publication with color drawing/picture(s) will be provided by the Office upon request and payment of the necessary fee.

FIGS. 4A and 4B are, respectively, a front view and a perspective view of inductive tuning elements (or twin iris obstacles) used at or toward a mouth of the waveguide according to an embodiment of the present invention.

FIGS. 5A and 5B are, respectively, a front view and a top view of an inductive tuning element (or an inductive obstacle element) used at or toward a mouth of the waveguide according to an embodiment of the present invention.

FIG. 6 is a graph of reflection coefficients from the mouth of the waveguide for an antenna with a polyrod and an antenna with both a polyrod and an inductive tuning element according to embodiments of the present invention.

DETAILED DESCRIPTION

Figure 1:
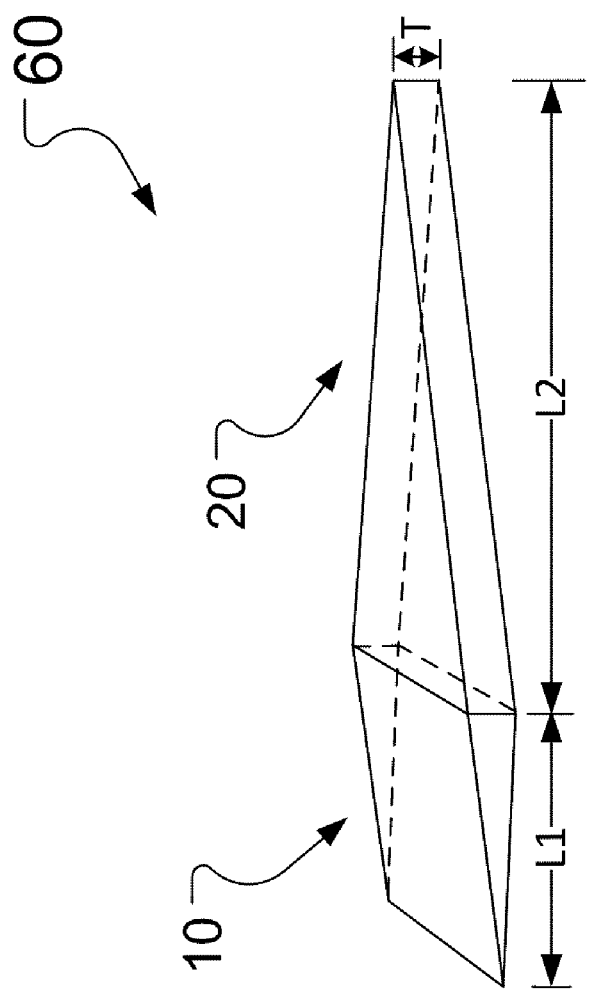
FIG. 1 is a schematic view of a conventional polyrod made of Teflon.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Embodiments of the present invention provide a broadband method and/or a broadband antenna for extracting constitutive properties from an electromagnetic material measurement occurs under plane wave conditions, because the ability to mimic a plane wave condition at the material sample is highly desired. The ability to perform such a measurement in a small region allows designers and users of electromagnetic materials to reliably determine the constitutive properties of materials of interest as a function of position. Applications for quality assurance and non destructive inspection of raw materials and finished structures are important. Determination and verification of the controlled Impedance and Resistance gradients of "Impedance Cards", such as used to reduce the diffraction from the edges of parabolic dish antennas, is also another important application.

Accordingly, an embodiment of the present invention is directed toward an antenna having a shaped dielectric rod with a matched aperture. The resulting antenna has a wideband impedance match that creates a Gaussian Beam in the radiating near field of the antenna, suitable to mimic in a small region plane wave conditions normally attained in the far field of the antenna.

Antennas are normally characterized in terms of their far field radiation patterns, directive gain and aperture efficiency. Accordingly, in an embodiment, there is provided a resulting antenna that has a wideband impedance match and a Gaussian Beam in the radiating near field of the antenna, suitable to mimic a small field of less than 2.5 in.×2.5 in., which is normally attained in the far field of the antenna.

In one embodiment, the antenna has a polyrod section interior to the waveguide is shaped like a wedge in the E-plane to minimize reflection in the air to dielectric transition as in the prior art but in addition the most significant mismatch, the termination of the metal waveguide, is essentially eliminated by matching the aperture using inductive obstacles (or inductive tuning elements).

Figure 2A:
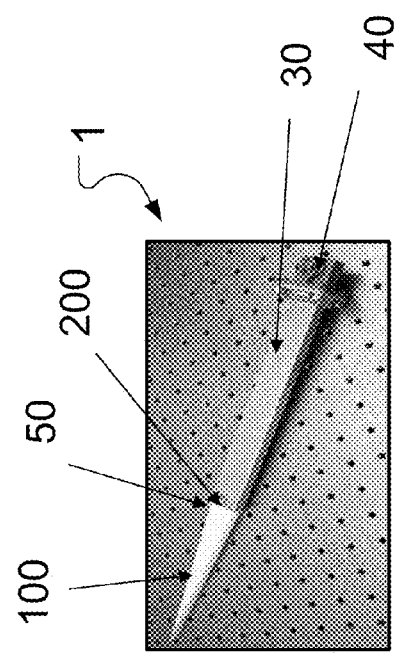
FIG. 2A is a photograph of aperture-matched polyrod antennas according to an embodiment of the present invention.
Figure 2B:
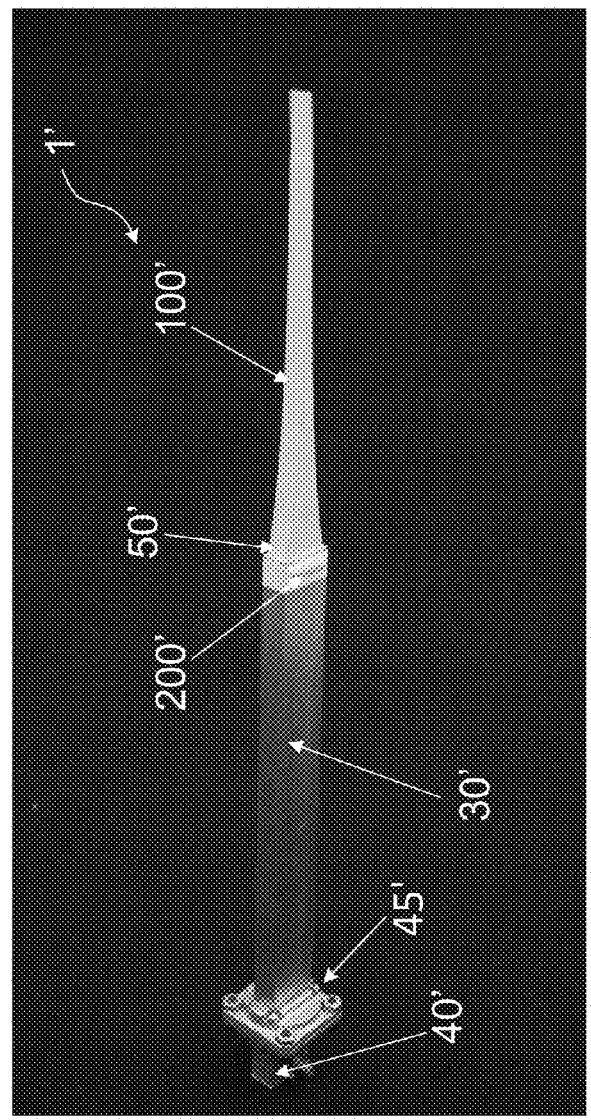
FIG. 2B is a photograph of aperture-matched polyrod antennas according to another embodiment of the present invention.

FIGS. 2A and 2B are photographs showing an antenna 1, 1' utilizing a polyrod 100, 100' with a tuning element (or inductive obstacle) 200, 200'. As can be seen at one end there is provided a coax to waveguide coupler 40, 40'. Connected to the coupler is a conventional X-band waveguide 30, 30' that is rectangular in shape. The waveguide has an open mouth 50, 50' that terminates at an end opposing an end that connects the waveguide to the coupler. The mouth 50, 50' of the waveguide is substantially rectangular and adapted to received one end of the polyrod 100, 100', particularly the shorter tapered end of polyrod 100, 100'.

Referring still to FIGS. 2A and 2B, the outer portion of the polyrod 100, 100' is tapered from the mouth 50, 50' of the waveguide 30, 30' and converged at the opposing end. At the mouth 50, 50' there is a notch or casing that enveloped an inductive obstacle 200, 200'.

In one embodiment, as shown in FIG. 2A, the polyrod 100 is linearly tapered from the mouth 50 to the opposing end. Alternatively, in another embodiment and referring to FIG. 2B, the polyrod 100' is shown to be exponentially tapered from the mouth 50' to the opposing end.

Figure 9:
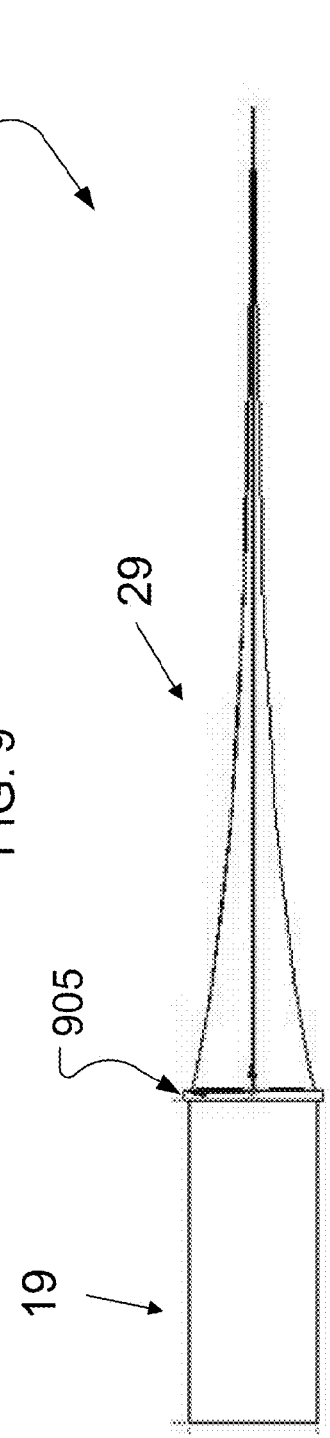
FIG. 9 is a schematic view of a polyrod according to an embodiment of the present invention.

In an embodiment, the antenna has a polyrod section interior to the waveguide that is shaped like a wedge in the E-plane, and the exterior section is tapered along a curve to both minimize (or reduce) end reflection and reflection in the air to dielectric transition In yet another embodiment, as shown in FIG. 9, an antenna includes a polyrod 900 which has a polyrod section interior 19 that is insertable in a waveguide, an intermediate section 905, and an exterior section 29 that is tapered along a curve to both minimize (or reduce) end reflection and reflection in the air to dielectric transition.

Figure 10:
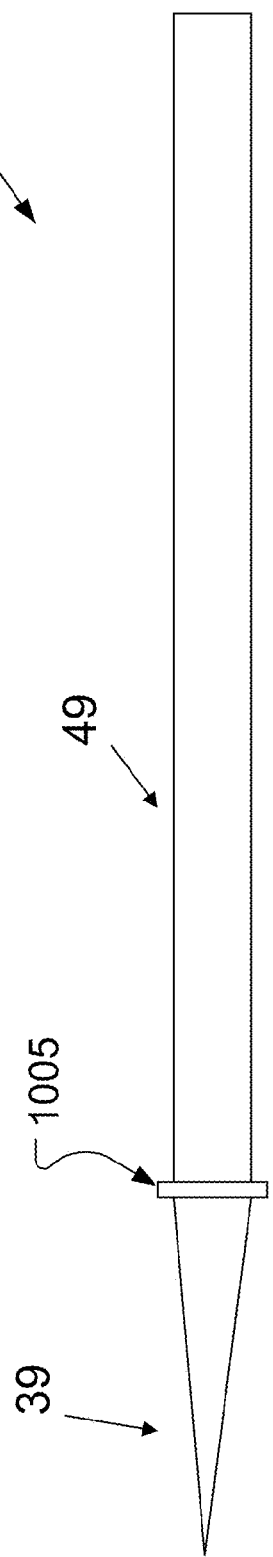
FIG. 10 is a schematic view of a polyrod according to an embodiment of the present invention.

In yet another embodiment, as shown in FIG. 10, an antenna has a polyrod 1000, where it is linearly tapered at an internal portion 39 and a longer external portion 49 that is not tapered (i.e., without having a tapered end).

In more detail, FIGS. 9 and 10 are schematics of exemplary models used in forming aperture matched polyrod antenna according to various aspects of the present invention. FIG. 9 shows a schematic of an external curve portion 29 of a polyrod 900, where the internal portion 19 is inserted with an X-band waveguide having a length of 58.23 mm and height of 22.70 mm according to an embodiment of the present invention.

FIG. 10 shows a schematic of a polyrod, where it is linearly tapered at an internal portion 39. In this particular embodiment, the length of the internal portion 39 is 58.23 mm, and the height at the longest path is 10.15 mm. Whereas, the longer external portion 49 has a length of 176.28 mm. The polyrod 1000 includes the internal portion 39, the longer external portion 49, and an intermediate section 1005 there between.

Referring now to FIG. 1, a polyrod made of Teflon, polytetrafluoroethylene (PTFE), is shown. This polyrod 60 includes two linearly tapered sections 10, 20. While the polyrod 60 of FIG. 1 has controlled wave endfire direction, the polyrod of an embodiment of the present invention minimizes (or reduces) end reflection, as well as phase variation across the Gaussian Beam and minimizes (or reduces) the diameter (1/e waist) of the Gaussian Beam. This is achieved by having the external part or the longer portion of the polyrod to be tapered along a curve to minimize (or reduce) end reflection.

In one embodiment, the antenna utilizes a conventional X-Band waveguide and coax to waveguide couplers and operates at an operating frequency ranging from 7.5 GHz to 20 GHz.

In one embodiment, the wideband impedance match of the polyrod antenna is attained through the combination of the linear E-plane taper of the dielectric inside the waveguide, the dielectric's effect in increasing the electrical size of the waveguide aperture, and the inductive tuning of its tuning elements (or metal aperture). Since there is nominally only one mode propagating inside the waveguide, the impedance match properties of the internal taper can be derived using the theory of continuous impedance transformers in transmission lines. The impedance of any section of waveguide partially filled by the dielectric can be reliably derived from the well-known solution to the rectangular waveguide filled with a dielectric slab.

It can be shown that reflection coefficients much less than −25 dB are easily attained with a few inches of taper. The aperture of the waveguide behaves as a capacitive discontinuity that becomes less reflective as frequency increases and the mouth of the aperture becomes electrically large. The dielectric filling increases the electrical size of the mouth and improves the match further at high frequencies. Therefore the task is to match the aperture at the low frequencies. Again transmission line theory can be used to design the required inductive discontinuities at or near the mouth and behind it that combined will produce the desired impedance match. Also, in one embodiment of the present invention, inductive tuning elements (or obstacles) such as irises, FIG. 4A are used for impedance matching. Moreover, in one embodiment of the present invention, tuning pins or posts as shown on FIG. 5A are utilized because they are easier to manufacture.

Figure 3:
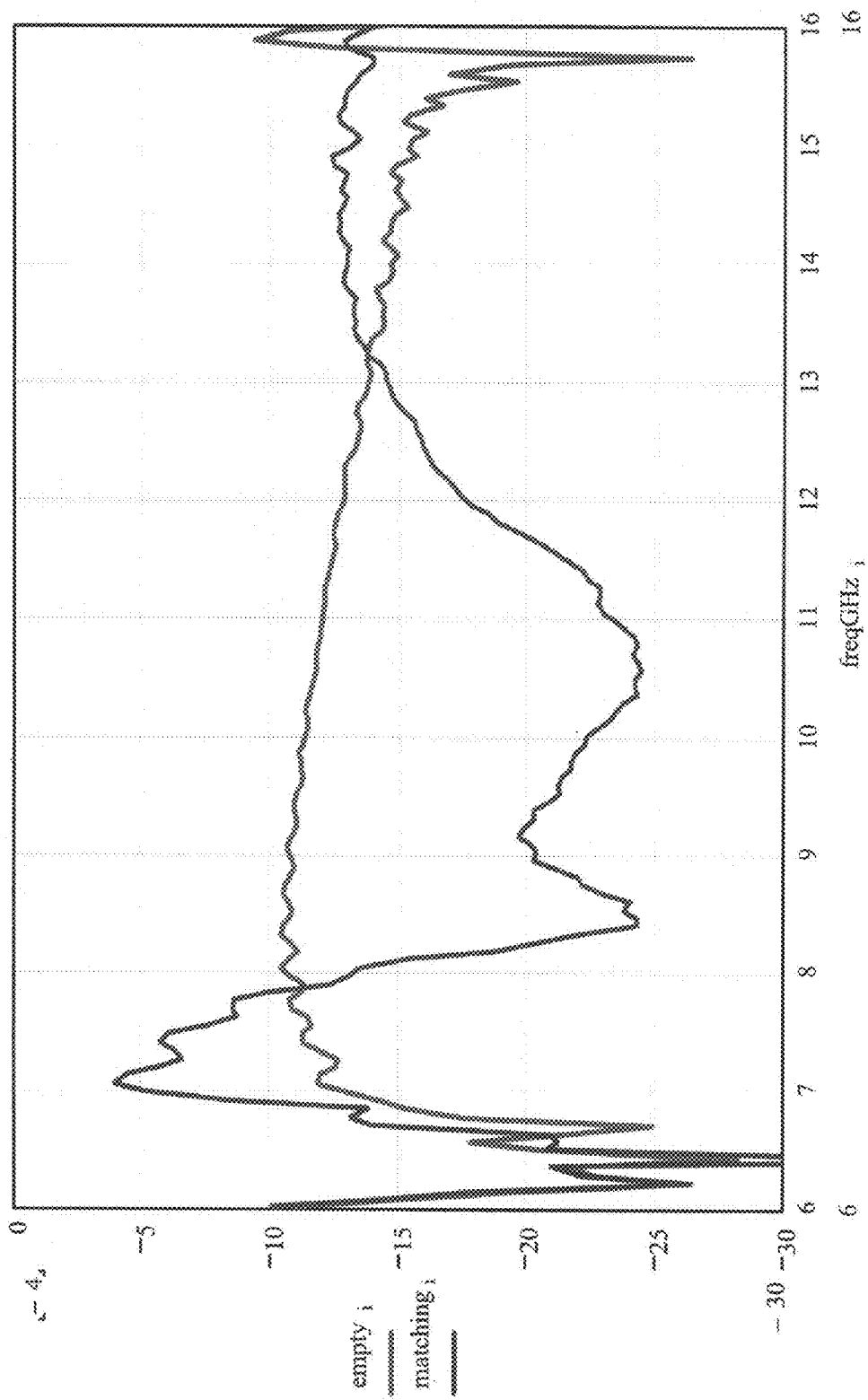
FIG. 3 is a graph of reflection coefficients for an X-band waveguide without and with inductive obstacle tuned to create a wide band match from 8 to 13 GHz.

FIG. 3 is a graph showing the measurement of matching effect, where reflection coefficient (dB) is measured as a function of frequency in GHz. The red curve shows the measured reflection coefficients from the mouth of an air-filled X-Band waveguide. Whereas, the blue curve shows the measured reflection coefficients from the mouth of the waveguide in a presence of an inductive tuning (or obstacle) element, such as a pair of twin iris obstacles, according to an embodiments of the present invention. As can be seen, it is possible to have a match attained with twin iris obstacles tuned to create a wide band match at a frequency ranging from about 8 to about 13 GHz.

FIGS. 4A and 4B illustrate exemplary tuning elements (i.e., twin iris obstacles) of an embodiment of the present invention. FIG. 4A is a front view of a mouth of a waveguide 30a with an inductive tuning (or obstacle) elements (or twin iris obstacles) 200a disposed at about the waveguide mouth area. In one embodiment, each iris panel 201a of the inductive tuning elements 200a is about 2 mm or less in width. In another embodiment, each iris panel 201a has a width of about 1.66 mm. The size of the panels 201a may change and configure to adapt to different operating frequency.

Here, as shown in FIG. 4B, to create a first iris, a first iris panel 201a is disposed next to a first side wall of the waveguide 30a at the mouth of the waveguide 30a, and a second iris panel 201a is disposed next to a second side wall of the waveguide 30a at the mouth of the waveguide 30a.

To create a second iris, a third iris panel 201a is disposed next to the first side wall of the waveguide 30a such that the first iris panel 201a is between the third iris panel 201a and the mouth of the waveguide 30a, and a fourth iris panel 201a is disposed next to the second side wall of the waveguide 30a such that the second iris panel 201a is between the fourth iris panel 201a and the mouth of the waveguide 30a.

In more detail, in one embodiment, an antenna may include a plurality of inductive obstacle panels 201a to form twin irises. Referring to FIG. 4B, two sets of inductive tuning elements (or obstacles) 200a are utilized. Here, as shown, a first set of the inductive tuning elements (or obstacles) 200a is disposed at a first distance, L1, away from the waveguide mouth, where the distance may be about 1.5 mm in length, and the second set is disposed at a second distance, L2, away from the first set, where L2 about ½ of an operating wavelength of the polyrod antenna.

In one embodiment, the inductive turning element (or obstacle element) includes a plurality of tuning pines (e.g., four tuning pins). They are disposed at the mouth of the waveguide as illustrated in FIGS. 5A and 5B to ensure a good match at the low end of the band since the increased electrical size of the aperture derived from the polyrod's dielectric loading already enhances the match at the high end.

FIG. 5A is a front view of a mouth of the waveguide 30b with an inductive turning element (or obstacle element) 200b disposed at about the waveguide mouth area. The inductive obstacle element 200b includes a plurality of pins 210a. In this particular embodiment as shown, there are four pins 210b, each with a diameter, d, of about 0.83 mm, that are placed across the waveguide mouth. A first pin 210b is placed about 2-pin-diameter distance from a first wall of the waveguide 30b, a second pin 210b is placed 1-pin diameter distance from the first pin 210b, a third pin 210b is placed about 2-pin diameter distance from a second wall of the waveguide 30b, and a fourth pin 210b is disposed at about 1-pin diameter distance from the third pin 210b.

Like the twin irises discussed above, there could be a plurality of inductive turning (or obstacle) element sets, where a first set of pins is placed at first inductive distance, L1, away from the mouth of the waveguide and a second set of pins is placed at a second inductive distance, L2, away from the first set.

Referring now back to FIGS. 5A and 5B, in one embodiment, the inductive turning (or obstacle) element 200b is disposed at about an inductive distance, L1, of about 1.5 m away from the mouth of the waveguide 30b, and the pin diameter, d, is about 0.83 mm.

While particular embodiments have been described in connection with what is presently considered to be practical exemplary embodiments, it is to be understood that the invention is not limited to the disclosed embodiment, but, on the contrary, is intended to cover various modifications and equivalent arrangements, such as there could be more than four pins comprising an inductive obstacle element and a plurality of sets of inductive obstacle elements disposed at the waveguide mouth area, and equivalents thereof. For example, there could be a first set of pins disposed with a second set of iris panels or a first set of iris panels disposed with a second set of pins.

FIG. 6 is a graph showing the measurement of matching effect using the above described polyrod and inductive elements. The graph shows reflection coefficients (dB) on the y-axis, where the reflection coefficient is a function of the operating frequency in GHz. The red curve shows the measured reflection coefficients from the mouth of the waveguide in the presence of a polyrod of an embodiment of the present invention only. Whereas, the blue curve shows the measured reflection coefficients from the mouth of the waveguide in both the presence of the polyrod and matching pins of embodiments of the present invention. As can be seen, it is possible to attain an aperture match equal to or better than −13 dB for a frequency range of from about 1 GHz to about 20 GHz.

Based on the foregoing, it is found that the external taper of the polyrod controls the planarity of the Gaussian Beam produced near its tip. The fundamental design rule to achieve maximum planarity is to create the smoothest possible change in phase velocity of the polyrod guided wave from the mouth of the waveguide to the tip. This change in phase velocity as a function of the polyrod width in the H-Plane can be estimated by using a two-dimensional model of the polyrod composed of cascade of dielectric slabs carrying the lowest order surface wave with H-field perpendicular to the dielectric walls.

Using the above described model it can be shown that a linear taper causes the wave to be tightly bound (slow phase velocity) over most of the rod and then suddenly released near the tip.

To optimize the release of the wave and the flatness of the produced Gaussian beam it is desirable to adjust the wave velocity linearly along the entire rod. Full wave three dimensional modeling of the dielectric rod is used to accomplish this goal and the result is verified by examining the radiated near field.

According to one embodiment of the present invention, when a dielectric constant of the polyrod is higher than 2, the polyrod should be exponentially tapered. In one embodiment, even when a dielectric material, such as Teflon, has a dielectric constant of 2, the tapered of the polyrod should not be linear. Using this approach, a polyrod using any suitable dielectric material can be designed.

Accordingly, various suitable materials with dielectric constants range from 1.7 to 3.5 can be used to design polygons that are linear or substantially linear when the dielectric constant is less than 2, or tapered along curve when the dielectric constant is equal to or more than 2. In one embodiment, the dielectric constant for the material used is 2.8. In another embodiment, Teflon is used as a polyrod material. However, other suitable materials with other suitable dielectric constants can also be used.

Figure 7:
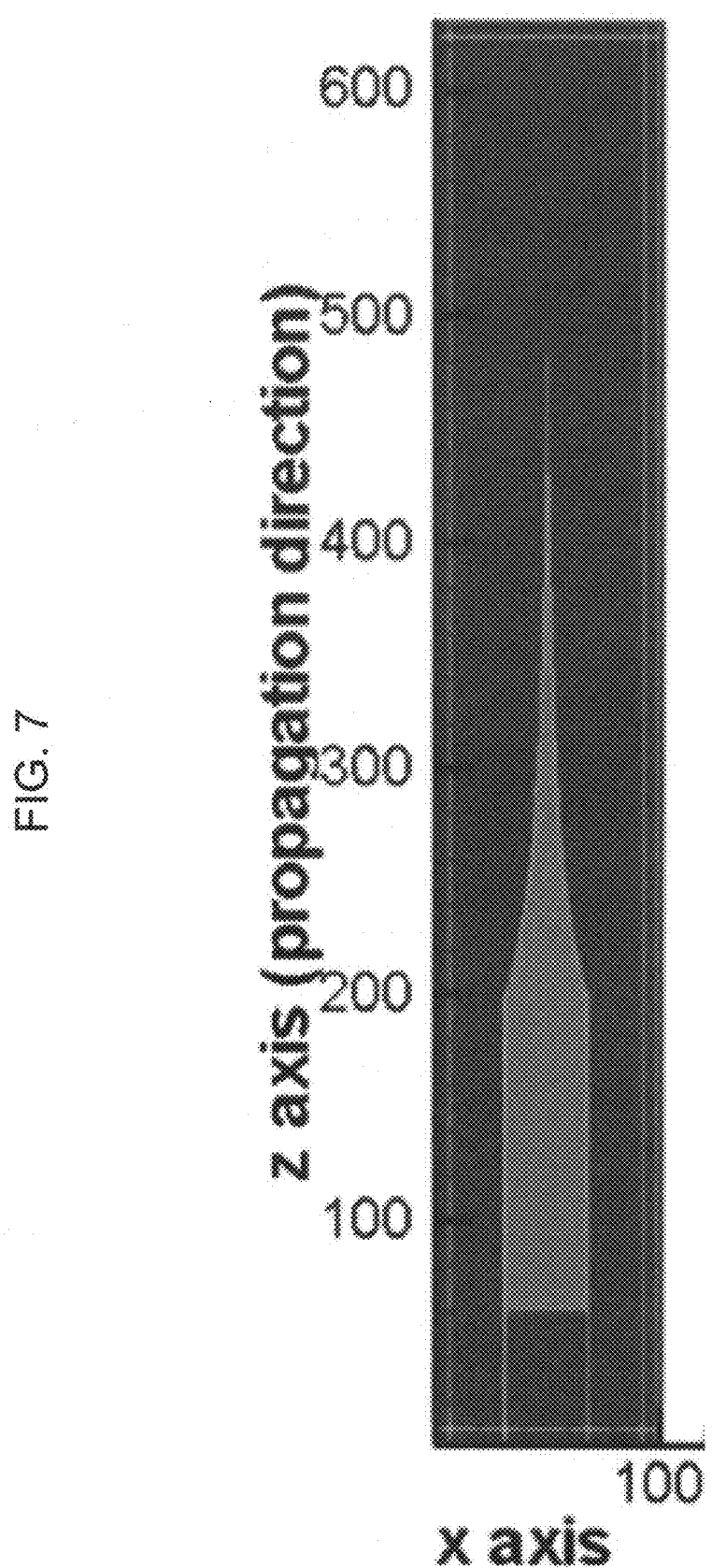
FIG. 7 is a schematic side view of a polyrod according to an embodiment of the present invention.

FIG. 7 shows an embodiment for a polyrod that is about 7 inches long. However, it will be understood that other geometries can also be used. This design was manufactured using stereolithography. However, it will be understood other manufacturing techniques that allow formation of a polyrod can also be used.

Figure 8:
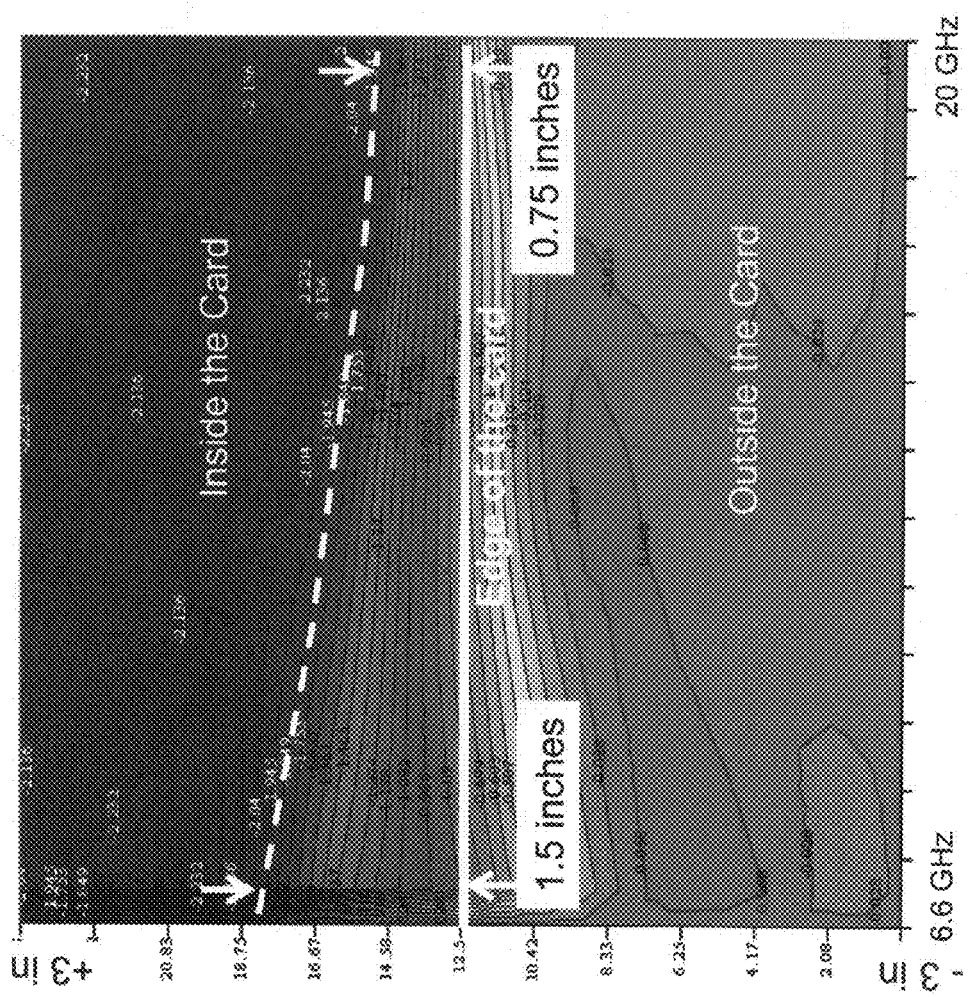
FIG. 8 is a graph showing a measurement of a resistive film using an embodiment of the present invention wherein the film is moved in between two polyrod antennas in order to measure the film's insertion loss as a function of frequency. The edge of the film is moved in 0.25 inch (or 0.25") increments from a starting point 3 inches away from the center of the polyrods' Gaussian beam to an ending point 3 inches past the center of the Gaussian beam. The spotsize of the Gaussian beam produced by the polyrods can be estimated from the contour line where the film's insertion loss is within 10% of its true value. This figure shows that the spotsize varies from 1.5 inch radius at 7 GHz to approximately 0.75 inch radius at 20 GHz.

In one embodiment, a 7 inches (or 7″) long polyrod fitted to a standard X-Band waveguide exhibits the spotsize behavior measured in FIG. 8. The antenna with the polyrod of this embodiment operates nominally from 7 GHz to 20 GHz.

Longer polyrods can be designed to obtain flatter phase fronts, if less flatness is required then shorter polyrods can be used. The shape of the polyrod minimizes or reduces the spot size and maximizes the flatness of the phase. Slight variations can be used to tweak the results and favor one or the other requirement.

Besides varying polyrod designs, further tweaking for aperture matching, for example, can be attained by providing inductive tuning at the waveguide mouth. In one embodiment, the aperture match is done using metal pins. However designs using other suitable inductive turning (or obstacle) elements can be used since the essence of the matching is the compensation of the waveguide aperture capacitance by inductive scatterers. While certain embodiments with specified dimensions is disclosed, the geometry and matching of the polyrod can to be adjusted according to electromagnetic frequency band and/or required operating wavelength. That is, the design structure can be suitably scaled to any suitable frequency band (e.g., from below UHF to mm wave) by suitably scaling the dimensions to the wavelength proportionately.

FIG. 8 shows the experimentally determined spotsize as a function of frequency of an antenna according to an embodiment of the present invention, as seen 0.75″ from its end. In the experiment, a pair of tapered matched polyrods aligned with each other are moved across a resistive sheet (R-Card) with insertion loss of the order of −2 dB so that as the card crosses the midplane of the polyrods it interrupts the signal propagating from one to the other. The measured insertion loss was plotted (y axis) versus the position of the probes relative to the edge of the R-Card from 3 inches away (−3 inches), which does not interrupt the beam, to 3 inches past the center of the beam (+3 inches), which fully interrupts the beam. The point at which the antennas register 90% of the correct value is demarcated by the dashed line. In this particular embodiment, it can be seen that the spotsize created varies from approximately 1.5 in. radius around 7 GHz to 0.75 in. radius near 20 GHz.

The spotsize varies slowly with distance from the antenna tip so that a material to be measured can be placed anywhere within 3 inches of the tip and still be measured with excellent reliability.

Figure 2C:
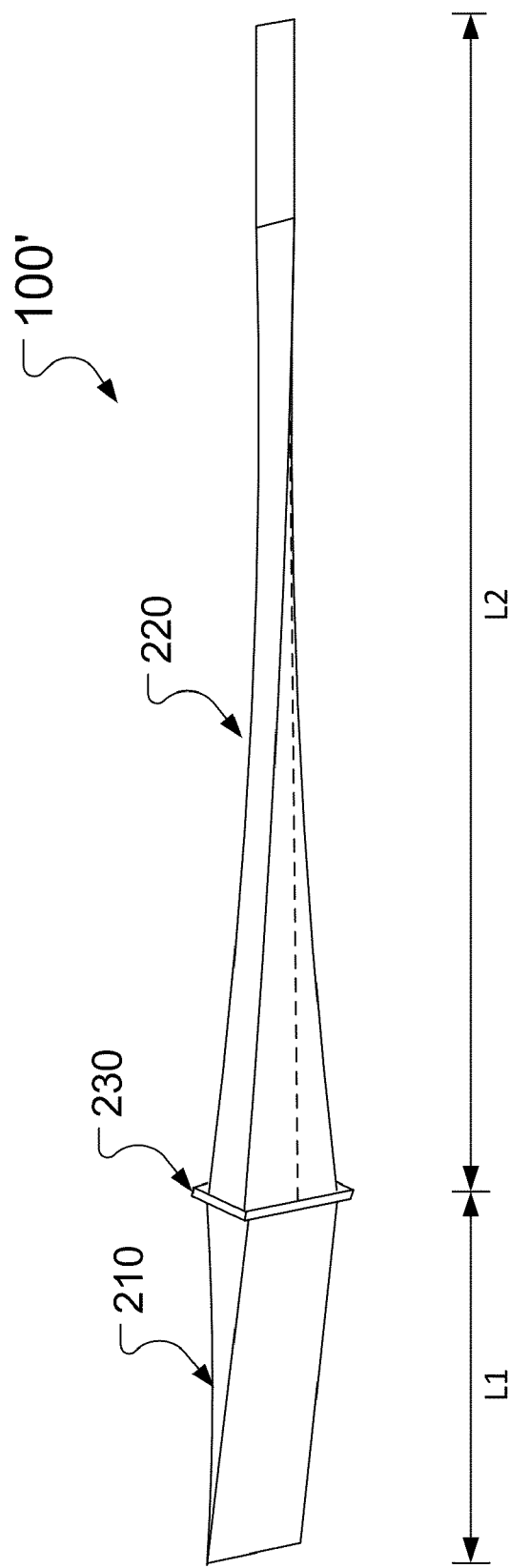
FIG. 2C shows a line drawing of the polyrod portion of the antenna depicted by FIG. 2B.

Referring to FIGS. 2B and 2C, an embodiment of the present invention provides a dielectric polyrod 100' including a short tapered section 210, a long tapered section 220, and an intermediate section 230, where the short tapered section 210 is extended between the intermediate section 230 and a first end with a length, L1, the long tapered section 220 is extended between the intermediate section 230 and a second end oppositely facing the first end with a length L2, and the long tapered section 220 is tapered along a curve, where L2 is substantially longer than L1.

In one embodiment, the short tapered section 210 is linearly tapered. In another embodiment, the long tapered section 220 is tapered along the curve that is substantially linear when the dielectric polyrod has a dielectric constant of about 2, or tapered along the curve that is exponentially shaped when the dielectric polyrod has a dielectric constant of about 3 or more.

An intermediate section 230 of the polyrod 100' has an intermediate thickness, wherein the first end has a first end thickness, and wherein the intermediate thickness is substantially larger than the first end thickness.

In one embodiment, the short tapered section of the polyrod includes a lower surface extending from the intermediate section to the first end, and an upper surface extending from the intermediate section to the first end, and wherein both the lower surface and the upper surface converge from the intermediate area to the first end.

The long tapered section includes a first side surface extending from the intermediate area to the second end and a second side surface extending from the intermediate area to the second end, and wherein both the first side surface and the second side surface converge from the intermediate area to the second end. Still referring to FIG. 1, the second end of the polyrod 100 has a second end thickness, T, where intermediate thickness is substantially equal to the second end thickness, T.

In one embodiment, the short tapered section has a length L1 of about 4 inches, the long tapered section has a length L2 of about 7 inches, and the intermediate thickness and the second end thickness, T, of about 0.4 inches. In this embodiment, the length of the short tapered section, the length of the long tapered section, and the intermediate thickness are configured to operate at a frequency range of 7 GHz to 18 GHz.

Referring to FIGS. 2A, 2B, 2C 4A, 4B, 5A, and 5B, embodiments of the present invention provides a polyrod antenna 1,1' that includes a dielectric polyrod 100, 100' having a first end, and a waveguide 30, 30', 30a, 30b for receiving the first end of the dielectric polyrod, where the waveguide 30, 30', 30a, 30b having a first waveguide surface facing a flange 45 and a second waveguide surface oppositely facing away from the first waveguide surface. According to at least one of these embodiments, a dielectric polyrod 100' includes a short tapered section 210, a long tapered section 220 and an intermediate section 230 between the short tapered section 210 and the long tapered section 220, wherein the short tapered section 210 extended between the intermediate section 230 and the first end, and the long tapered section 220 is extended between the intermediate section 230 and a second end oppositely facing the first end, and wherein the long tapered section 220 is tapered along a curve.

In one embodiment, the short tapered section is linearly tapered and the long tapered section is tapered along the curve that is substantially linear when the dielectric polyrod has a dielectric constant of about 2. In another embodiment, the long tapered section is tapered along the curve that is exponentially shaped when the dielectric polyrod has a dielectric constant of about 3 or more.

Referring still to FIGS. 2A, 2B, 4A, 4B, 5A, and 5B, an embodiment of the present invention provides a polyrod antenna 1, 1' with an inductive tuning element 200, 200', 200a, 200b disposed at an inductive tuning distance away from the second waveguide surface 50, 50'. The inductive tuning element 200, 200', 200a, 200b may be a plurality of matching pins 210b, wherein each of the matching pins 210b has a pin diameter, and the pins 210b are spaced apart from each other by an interval distance equal to or larger than the pin diameter.

Alternatively, according to FIGS. 4A and 4B, the inductive tuning element 200, 200' 200a may be a set of inductive tuning elements (or iris obstacles) 200a having first and second inductive iris panels 210a defining an iris, where the first inductive iris panel 210a is disposed at a first side wall of the waveguide 30a, and the second inductive iris panel 210a is disposed at a second side wall of the waveguide 30a.

Referring back to FIGS. 5A and 5B, a waveguide 30 having a set of inductive obstacle element 200. Here, the inductive obstacle element 200 includes 4 pins, where each pin diameter is about 0.83 mm. In this embodiment, the pins are disposed at an inductive tuning distance, L1, about 1.5 mm from the mouth of the waveguide, such that the pin diameter and the inductive tuning distance are configured to operate at a frequency ranging from about 7 GHz to about 18 GHz.

Referring back to FIG. 4B. In one embodiment of the present invention, there is provided a plurality set of inductive turning (or obstacle) elements 200a. Here, there are two sets of inductive obstacle elements 200a having a first set disposed at a first inductive tuning distance, L1, away from the mouth of the waveguide, or the second waveguide surface 420, and a second set being disposed at a second inductive tuning distance, L2, away from the first inductive tuning element and toward the first waveguide surface 430. In one embodiment, the second inductive tuning distance, L2, is one half of an operating wavelength of the polyrod antenna.

In this embodiment, both the first inductive tuning element and the second inductive tuning element are inductive irises.

Referring back to FIG. 5A, an inductive tuning element 200b having a plurality of matching pins 210a is shown. Here the pins 210a are spaced apart by an interval distance, where each of the pins 210a has a pin diameter, and a first pin of the pins 210a is disposed at a 2-pin diameter distance away from a first side wall of the waveguide, a second pin of the pins 210a is disposed 1-pin diameter away from the first pin, a third pin of the pins 210a is disposed at a 2-pin diameter distance away from a second side wall of the waveguide, and a fourth pin of the pins 210a is disposed 1-pin diameter away from the third pin.

In view of the foregoing, an embodiment of the present invention provides an aperture matched polyrod antenna that launches electromagnetic wave from the tip of the polyrod to provide an ideal quasi-plane wave compact region for examining the properties of materials, especially impedance sheets. The aperture matched polyrod antenna has a Gaussian beam in the Fresnel zone of the antenna with nearly flat phase fronts at the tip of the polyrod and throughout its Fresnel zone. This is accomplished by having a polyrod that is tapered along a curve as a function of a dielectric constant of a polyrod material. The curve can be substantially linear if the dielectric constant is less than 2, or curve with an exponential shape if the dielectric constant is more than 2. In addition, aspects of embodiments of the present invention also provide inductive tuning elements that can be used at a waveguide mouth to provide desired matching impedance.

While particular methods have been described in connection with what is presently considered to be practical exemplary embodiments, it is to be understood that the invention is not limited to the disclosed embodiment, but, on the contrary, is intended to cover various modifications and equivalent arrangements included within the spirit and scope of the appended claims, and equivalents thereof.

What is claimed is:

1. A polyrod antenna comprising:
a dielectric polyrod having a first end; and
a waveguide for receiving the first end of the dielectric polyrod,
   wherein the waveguide has a first waveguide surface facing a flange and a second waveguide surface oppositely facing away from the first waveguide surface,
   wherein the dielectric polyrod comprises a short tapered section, a long tapered section, and an intermediate section,
   wherein the short tapered section is extended between the intermediate section and the first end, wherein the long tapered section is extended between the intermediate section and a second end oppositely facing the first end, wherein the long tapered section is tapered along a curve, and
   wherein the waveguide has an inductive tuning element disposed at an inductive tuning distance away from the second waveguide surface.

2. The polyrod antenna of claim 1, wherein the short tapered section is linearly tapered.

3. The polyrod antenna of claim 1, wherein the long tapered section is tapered along the curve that is substantially linear when the dielectric polyrod has a dielectric constant of about 2.

4. The polyrod antenna of claim 1, wherein the long tapered section is tapered along the curve that is exponentially shaped when the dielectric polyrod has a dielectric constant of about 3 or more.

5. The polyrod antenna of claim 1, wherein the inductive tuning element comprises a plurality of matching pins, wherein each of the matching pins has a pin diameter, and wherein the pins are spaced apart from each other by an interval distance equal to or larger than the pin diameter.

6. The polyrod antenna of claim 5, wherein the pin diameter is about 0.83 mm, wherein the inductive tuning distance is about 1.5 mm, and the pin diameter and the inductive tuning distances are configured to operate at a frequency ranging from about 7 GHz to about 20 GHz.

7. The polyrod antenna of claim 1, wherein the inductive tuning element comprises first and second inductive iris panels defining an iris, wherein the first inductive iris panel is disposed at a first side wall of the waveguide, and the second inductive iris panel is disposed at a second side wall of the waveguide.

8. The polyrod antenna of claim 1, wherein the polyrod antenna has a wideband impedance match that creates a Gaussian Beam in the radiating near field of the antenna.

9. A polyrod antenna comprising:
a dielectric polyrod having a first end; and
a waveguide for receiving the first end of the dielectric polyrod,
   wherein the waveguide has a first waveguide surface facing a flange and a second waveguide surface oppositely facing away from the first waveguide surface,
   wherein the dielectric polyrod comprises a short tapered section, a long tapered section, and an intermediate section,
   wherein the short tapered section is extended between the intermediate section and the first end, wherein the long tapered section is extended between the intermediate section and a second end oppositely facing the first end, wherein the long tapered section is tapered along a curve, and
   wherein the waveguide comprises a first inductive tuning element disposed at a first inductive tuning distance away from the second waveguide surface, and a second inductive tuning element disposed at a second inductive tuning distance away from the first inductive tuning element and toward the first waveguide surface.

10. The polyrod antenna of claim 9, wherein the first inductive tuning element and the second inductive tuning element are inductive irises.

11. The polyrod antenna of claim 9, wherein the second inductive tuning distance is one half of an operating wavelength of the polyrod antenna.

12. The polyrod antenna of claim 9, wherein the polyrod antenna has a wideband impedance match that creates a Gaussian Beam in the radiating near field of the antenna.

13. A polyrod antenna comprising:
a dielectric polyrod having a first end; and
a waveguide for receiving the first end of the dielectric polyrod,
   wherein the waveguide has a first waveguide surface facing a flange and a second waveguide surface oppositely facing away from the first waveguide surface,
   wherein the dielectric polyrod comprises a short tapered section, a long tapered section, and an intermediate section,
   wherein the short tapered section is extended between the intermediate section and the first end, wherein the long tapered section is extended between the intermediate section and a second end oppositely facing the first end, wherein the long tapered section is tapered along a curve, and
   wherein the waveguide comprises an inductive tuning element comprises a plurality of matching pins spaced apart by an interval distance, wherein each of the pins has a pin diameter,
   wherein a first pin of the pins is disposed at a 2-pin diameter distance away from a first side wall of the waveguide, a second pin of the pins is disposed 1-pin diameter away from the first pin, a third pin of the pins is disposed at a 2-pin diameter distance away from a second side wall of the waveguide, and a fourth pin of the pins disposed 1-pin diameter away from the third pin.

14. The polyrod antenna of claim 13, wherein the polyrod antenna has a wideband impedance match that creates a Gaussian Beam in the radiating near field of the antenna.

* * * * *